United States Patent
Adamec et al.

[19]

[11] Patent Number: 5,917,422

[45] Date of Patent: Jun. 29, 1999

[54] SYSTEM AND METHOD OF ASSIGNING AN ELECTRONIC SERIAL NUMBER TO A RADIO FREQUENCY DEVICE

[75] Inventors: Andrew J. Adamec, Duluth; John C. Goodwin, III, Suwanee, both of Ga.

[73] Assignee: NCR Corporation, Dayton, Ohio

[21] Appl. No.: 08/882,775

[22] Filed: Jul. 10, 1997

[51] Int. Cl.[6] .................................................. G06F 17/00

[52] U.S. Cl. ............................... 340/825.35; 340/825.54; 340/825.22; 340/825.15; 235/375; 705/22; 705/28; 705/1

[58] Field of Search ...................... 340/825.35, 825.54, 340/825.15, 825.22, 825.52; 235/375, 383, 385; 364/478.03, 478.13, 479.08; 705/1, 22, 26, 28, 30

[56] References Cited

U.S. PATENT DOCUMENTS

| | | | |
|---|---|---|---|
| 4,636,950 | 1/1987 | Caswell et al. ........................ | 364/403 |
| 4,796,209 | 1/1989 | Burk ....................................... | 364/559 |
| 5,113,349 | 5/1992 | Nakamura et al. ..................... | 364/478 |
| 5,237,496 | 8/1993 | Kagami et al. ......................... | 364/401 |
| 5,619,416 | 4/1997 | Kosarew ............................. | 364/478.13 |
| 5,694,418 | 12/1997 | Goodwin, III ......................... | 375/219 |
| 5,729,696 | 3/1998 | Goodwin, III et al. ................ | 395/222 |
| 5,765,143 | 6/1998 | Sheldon et al. ......................... | 705/28 |
| 5,774,876 | 6/1998 | Woolley et al. ......................... | 705/28 |

Primary Examiner—William A. Cuchlinski, Jr.
Assistant Examiner—Yonel Beaulieu
Attorney, Agent, or Firm—Paul W. Martin; Peter H. Priest

[57] ABSTRACT

A system and method of assigning an electronic serial number to a radio frequency (RF) device which minimizes handling of RF devices. The system includes a first isolation chamber which programs a first group of RF devices including the one RF device with a first electronic serial number, a holding area external to the first isolation chamber for separating the first group of RF devices into a plurality of second groups of RF devices including a third group of RF devices containing the one RF device, and a second isolation chamber which programs the one RF device with a second electronic serial number different from the first electronic serial number and different from third electonic serial numbers assigned to other RF devices within the third group.

10 Claims, 1 Drawing Sheet

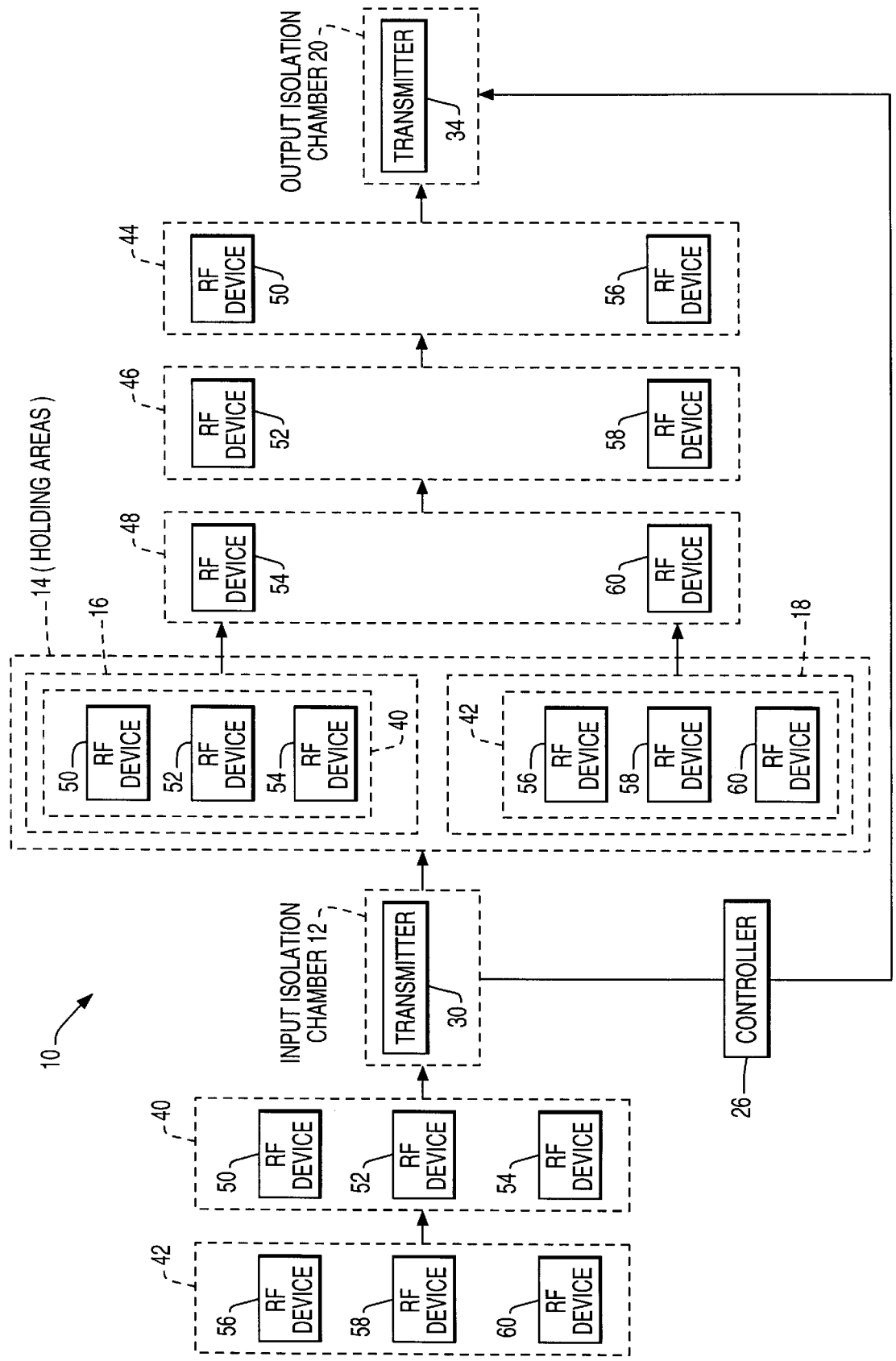

SYSTEM AND METHOD OF ASSIGNING AN ELECTRONIC SERIAL NUMBER TO A RADIO FREQUENCY DEVICE

BACKGROUND OF THE INVENTION

The present invention relates to radio frequency (RF) devices and methods of communication between radio frequency devices, and more specifically to a system and method of assigning an electronic serial number to a radio frequency device.

Unique electronic serial numbers must often be assigned to newly manufactured RF devices. Unique addresses facilitate communication with individual RF devices.

One type of RF device may be an electronic price label (EPL). EPL systems typically include a plurality of EPLs for each merchandise item in a store. EPLs transmit acknowledgment signals acknowledging receipt of messages and relay acknowledgment signals from other EPLs to receiving devices coupled to a main EPL computer. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

Assigning addresses to a group of EPLs is difficult. Since all newly manufactured EPLs are identical, there is no way to individually program them without isolating one from the others. The traditional method involves isolating a single EPL and transmitter inside a shielded enclosure. The single EPL is programmed, and the procedure is repeated for each and every EPL. This method is too time-consuming and costly.

Therefore, it would be desirable to provide a system and method of assigning an electronic serial number to an RF device, such as an EPL, which requires minimal isolation.

SUMMARY OF THE INVENTION

In accordance with the teachings of the present invention, a system and method of assigning an electronic serial number to a radio frequency (RF) device is provided.

The system includes a first isolation chamber which programs a first group of RF devices including the one RF device with a first electronic serial number, a holding area external to the first isolation chamber for separating the first group of RF devices into a plurality of second groups of RF devices including a third group of RF devices containing the one RF device, and a second isolation chamber which programs the one RF device with a second electronic serial number different from the first electronic serial number and different from third electronic serial numbers assigned to other RF devices within the third group.

The method of assigning an electronic serial number to a plurality of radio frequency (RF) devices includes the steps of programming a first group of RF devices with a first electronic serial number in a first isolation chamber, programming a second group of RF devices with a second electronic serial number in the first isolation chamber, separating the first and second groups of RF devices into a plurality of third groups of RF devices each containing a first RF device from the first group of RF devices and a second RF device from the second group of RF devices, and programming each of the RF devices within the third groups with third unique electronic serial numbers in a second isolation chamber.

It is accordingly an object of the present invention to provide a system and method of assigning an electronic serial number to an RF device.

It is another object of the present invention to provide a system and method of assigning electronic serial numbers to a plurality of EPLs.

It is another object of the present invention to provide a system and method of assigning different electronic serial numbers to a plurality of EPLs without having to isolate EPLs from each other.

It is another object of the present invention to minimize the cost and handling associated with assigning electronic serial numbers to a plurality of RF devices.

BRIEF DESCRIPTION OF THE DRAWING

Additional benefits and advantages of the present invention will become apparent to those skilled in the art to which this invention relates from the subsequent description of the preferred embodiments and the appended claims, taken in conjunction with the accompanying drawing, which illustrates a block diagram of the system of the present invention.

DESCRIPTION OF THE PREFERRED EMBODIMENT

Referring now to FIG. 1, system 10 includes input isolation chamber 12, holding areas 14, output isolation chamber 20, and controller 26.

Input isolation chamber 12 changes a default serial number common to all RF devices from manufacture to a new serial number for each RF device within a group. Group 40 includes RF devices 50–54. Group 42 follows group 40 through input isolation chamber 12 and includes RF devices 56–60.

For this purpose, many RF devices include internal static RAM, which allows their serial number or unique ID to be programmed after manufacture. Controller 26 issues commands addressed to a serial number. RF devices 50–60 may be electronic price labels (EPLs).

Input isolation chamber 12 additionally includes transmitter 30 for communicating serial number assignments to RF devices 50–54 and 56–60. Input isolation chamber 12 contains anechoic material which prevents RF signals from escaping.

Transmitter 30 is controlled by controller 26, which is preferably a computer system. Transmitter 30 sends commands to all RF devices in a group to replace their default serial numbers with a temporary serial number. For example, transmitter 30 replaces the default serial number of RF devices 50–54 with a first temporary serial number determined by controller 26 and replaces the default serial number of RF devices 56–60 with a second temporary serial number determined by controller 26.

Each group of RF devices is processed individually through input isolation chamber 12; however, the present invention envisions any number of isolation chambers to process groups in parallel. The present invention also envisions any number of groups and any number N of RF devices in each group.

Each group of RF devices proceeds to holding areas 14. Holding areas 14 include separate holding areas 16 and 18 for each of groups 40 and 42. Holding areas 16 and 18 may be separate tables or conveyor surfaces.

Holding areas 16 and 18 allow RF devices from different groups to be reassigned to new groups prior to being moved through output isolation chamber 20. In more detail, RF devices 50 and 56 are assigned to a new group 44, RF devices 52 and 58 are assigned to a new group 46, and RF devices 54 and 60 are assigned to a new group 48.

There is a holding area for each group. Thus, for M groups there are M holding areas.

Output isolation chamber 20 includes transmitter 34.

Output isolation chamber 20 replaces serial numbers of RF devices within the new groups with final serial numbers so that all of the RF devices have unique serial numbers. To accomplish this task, output isolation chamber 20 communicates with each RF device individually, since each RF device has a unique serial number in its new group by which controller 26 can address messages.

Thus, when processing new group 44, controller 26 communicates with only RF device 50 to replace its temporary serial number with a final serial number and with only RF device 56 to replace its temporary serial number with a final serial number. Groups 46 and 48 are processed individually in the same way.

Advantageously, this process requires a minimal amount of isolation for each RF device, particularly if M and N are large numbers. In fact, the process eliminates the need for individually isolating each RF device during the serial number assignment process (assuming N does not equal one). The process is desirable because it reduces the amount of handling for each RF device, thereby reducing the manufacturing cost of the product. Also, the process may be easily automated.

Although the present invention has been described with particular reference to certain preferred embodiments thereof, variations and modifications of the present invention can be effected within the spirit and scope of the following claims.

What is claimed is:

1. A system for assigning an electronic serial number to a radio frequency (RF) device comprising:

a first isolation chamber having a first transmitter which programs a first group of RF devices including the one RF device with a first electronic serial number;

a holding area external to the first isolation chamber for separating the first group of RF devices into a plurality of second groups of RF devices including a third group of RF devices containing the one RF device; and a second isolation chamber having a second transmitter which programs the one RF device with a second electronic serial number different from the first electronic serial number and different from third electronic serial numbers assigned to other RF devices within the third group.

2. The system as recited in claim 1, wherein the RF device comprises an electronic price label.

3. A system for assigning an electronic serial number to a plurality of radio frequency (RF) devices comprising:

a first isolation chamber having a first transmitter which programs the plurality of RF devices in first groups with first electronic serial numbers unique to each of the first groups;

a holding area external to the first isolation chamber for separating the first groups of RF devices into a plurality of second groups of RF devices in which each RF device in any one of the first groups is separated from any other RF device in the one group; and a second isolation chamber having a second transmitter which programs the RF devices within the second groups with unique electronic serial numbers.

4. The system as recited in claim 1, wherein the RF device comprises an electronic price label.

5. The system as recited in claim 1, wherein the first transmitter transmits first programming instructions to the RF devices in the first groups;

wherein the second transmitter transmits second programming instructions to the RF devices in the second groups; and wherein the system further includes a controller coupled to the first and second transmitters.

6. A method of assigning an electronic serial number to a plurality of radio frequency (RF) devices comprising the steps of:

programming a first group of RF devices with a first electronic serial number transmitted by a first transmitter located in a first isolation chamber;

programming a second group of RF devices with a second electronic serial number transmitted by the first transmitter located in the first isolation chamber;

separating the first and second groups of RF devices into a plurality of third groups of RF devices each containing a first RF device from the first group of RF devices and a second RF device from the second group of RF devices; and programming each of the RF devices in the third groups with third unique electronic serial numbers transmitted by a second transmitter located in a second isolation chamber.

7. A method of assigning an electronic serial number to a plurality of electronic price labels (EPLs) comprising the steps of:

separating the EPLs into first groups of EPLs wherein at least one of the first groups has at least a number N of EPLs;

programming each of the first groups of EPLs with first electronic serial numbers unique to each of the first groups transmitted by a first transmitter located in a first isolation chamber;

separating the first groups of EPLs into N second groups of EPLs wherein at least one of the second groups contains a first EPL from each of the first groups of EPLs; and programming each of the second groups of EPLs with unique second electronic serial numbers transmitted by a second transmitter located in a second isolation chamber.

8. A system for assigning a unique final electronic serial number to each one of plurality of radio frequency (RF) devices having a common as manufactured default serial number comprising:

a first isolation chamber including a transmitter which programs a first group of the plurality of RF devices with a first temporary electronic serial number, further groups of the plurality of RF devices also being programmed in isolation with each group having its own unique temporary electronic serial number;

a holding area external to the first isolation chamber for separating the first and further groups of RF devices into a plurality of second groups of RF devices with each RF device in said plurality of second groups of RF devices having a unique temporary electronic serial number; and a second isolation chamber which programs at least one of said plurality of second groups utilizing a second transmitter by addressing each RF device by its unique temporary electronic serial number and programming it with a unique final serial number.

9. The system as recited in claim 8, wherein the RF devices comprise electronic price labels.

10. A method of assigning a unique final electronic serial number to each one of a plurality of radio frequency (RF) devices having a common as manufactured default serial number comprising the steps of:

programming a first group of the plurality of RF devices with a first temporary electronic serial number in a first isolation chamber by transmitting the first temporary electronic serial number to all of the RF devices in the first group;

programming a second group of the plurality of RF devices with a second temporary electronic serial number in the first isolation chamber by transmitting the second temporary electronic serial to all of the RF devices in the second group;

separating the first and second groups of RF devices into a plurality of third groups of RF devices each containing a first RF device from the first group of RF devices and a second RF device from the second group of RF devices; and programming each of the RF devices in one of the third groups with a final unique electronic serial number in a second isolation chamber by addressing each of the RF devices individually utilizing its temporary electronic serial number and programming the final unique electronic serial number.

\* \* \* \* \*